Dec. 23, 1930.  D. B. BULLARD  1,786,147
CHUCK
Filed Jan. 15, 1927  2 Sheets-Sheet 1

INVENTOR.
Dudley B. Bullard
BY
Chamberlain + Newman
ATTORNEYS

Dec. 23, 1930.   D. B. BULLARD   1,786,147
CHUCK
Filed Jan. 15, 1927   2 Sheets-Sheet 2

INVENTOR.
Dudley B. Bullard
BY Chamberlain & Newman
ATTORNEYS

Patented Dec. 23, 1930

1,786,147

UNITED STATES PATENT OFFICE

DUDLEY B. BULLARD, OF SOUTHPORT, CONNECTICUT, ASSIGNOR TO THE BULLARD COMPANY, OF BRIDGEPORT, CONNECTICUT, A CORPORATION OF CONNECTICUT

CHUCK

Application filed January 15, 1927. Serial No. 161,319.

The present invention relates to an improved automatic chuck, particularly for turning or spindle machines of the single or multiple spindle type, although it will be understood that the invention may be used with various types of machines, in which it is desirable to employ power chucking means.

An object is to provide a chucking mechanism, operated by the power of the machine, and in which the chuck actuating means will be positive in action and will provide a uniform movement and distribution of power during the chucking operation. Another object is to provide a chuck actuating mechanism which is free of pivotally mounted parts, gears, or other parts, which are subject to relatively rapid deterioration and wear, and to this end, it is proposed, in the present embodiment, to provide reciprocating parts, so arranged with relation to the load and the application of power that the strain is distributed in the most efficient manner.

A further object is to provide a mechanism which may be readily reversed for either inward or outward chucking action, and in which the distribution of power and strain will be the same in either relation.

With the above and other objects in view, an embodiment of the invention is shown in the accompanying drawings, and this embodiment will be hereinafter more fully described with reference thereto, and the invention will be finally pointed out in the claims.

In the drawings:—

Similar reference characters indicate corresponding parts throughout the several figures of the drawings.

Figure 1:
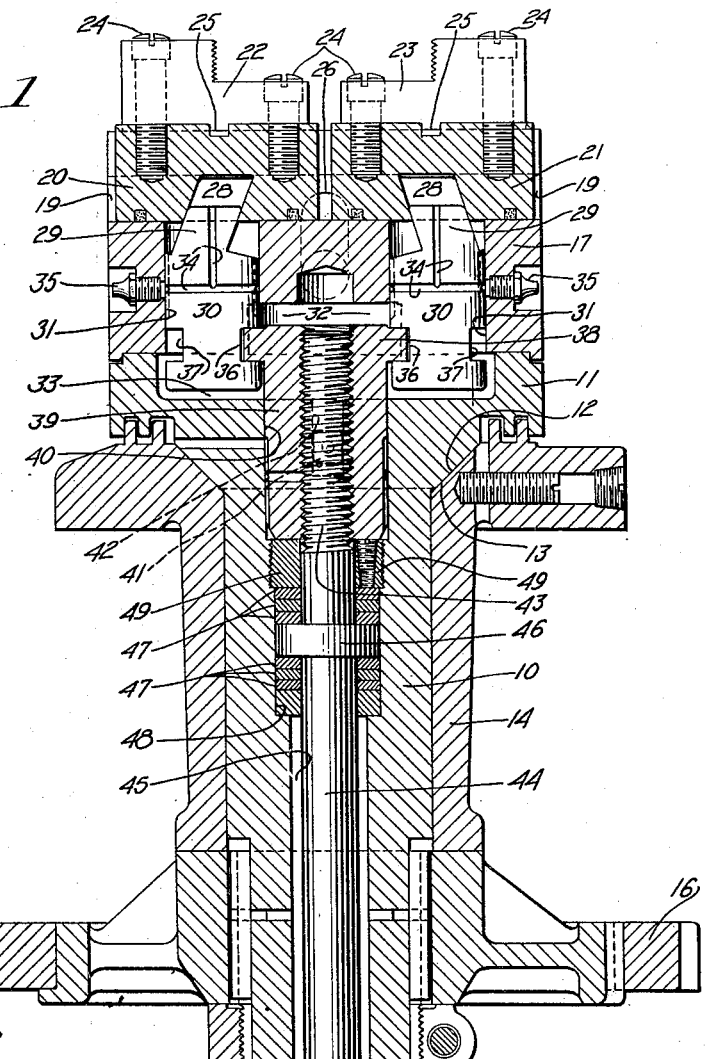
Fig. 1 is a vertical sectional view of a work carrying table and spindle, provided with chuck actuating means, according to the present embodiment of the invention.
Figure 6:
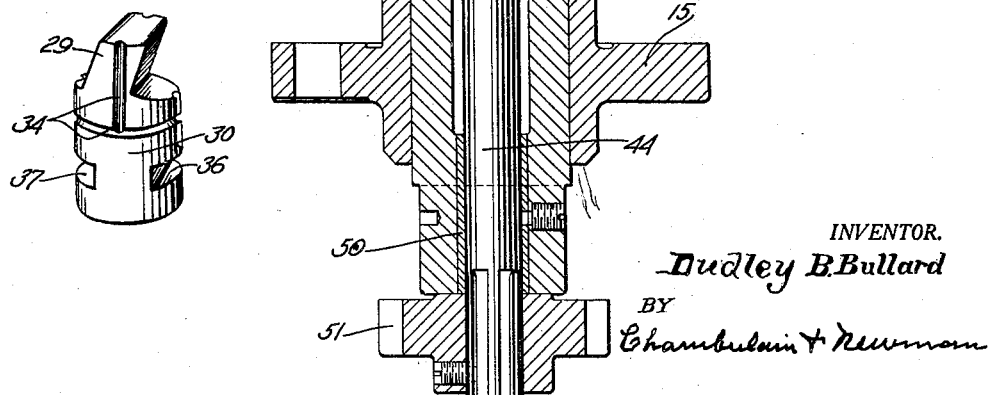
Fig. 6 is a perspective view of one of the chuck-slide actuating plungers employed.

Referring to the drawings, the chucking mechanism, according to the present embodiment of the invention, comprises a vertically disposed spindle 10 provided at its upper end with a work table base 11, and with an annular conical portion 12 engaging a conical seat 13 of a stationary bearing support 14. In downwardly spaced relation to the bearing 14 the spindle is further supported by a lower bearing support 15, and between these bearings a large gear 16 is keyed to the spindle and is adapted through suitable drive means (not shown) to rotate the spindle, this drive means being of a well known type adapted to be inoperative during the operation of the chucking mechanism, so that the spindle is stationary while the operator removes the completed work and places a new piece in the chuck.

Figure 2:
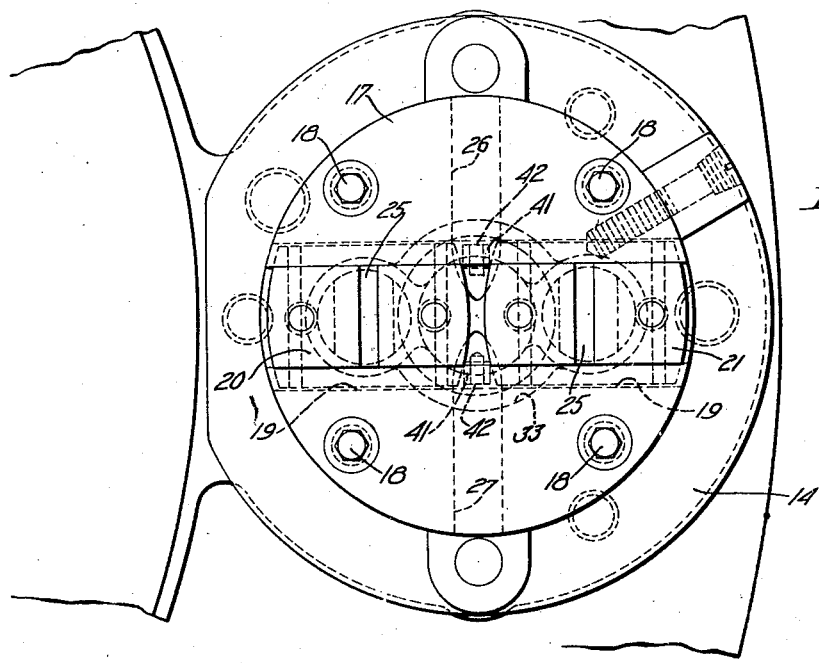
Fig. 2 is a top plan view thereof, with the chuck jaws removed.
Figure 4:
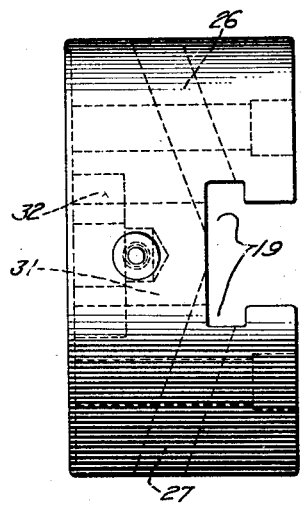
Fig. 4 is a side elevation thereof.
Figure 3:
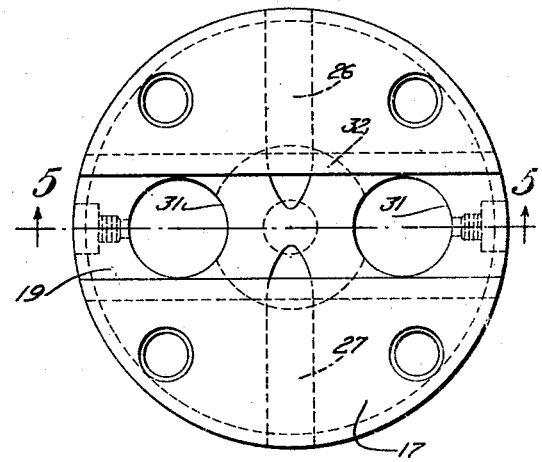
Fig. 3 is a plan view of the work table element, the chuck slides and actuating parts being removed.
Figure 5:
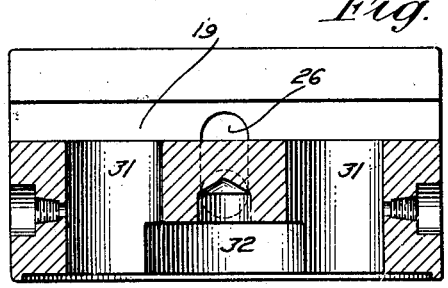
Fig. 5 is a sectional view taken along the line 5—5 of Fig. 3.

Upon the work table base 11 at the upper end of the spindle there is mounted the work carrying table 17, secured thereto by bolts 18 (Fig. 2), and provided in its upper surface with a diametrically extending chuck-slide receiving slot 19, of inverted T-shape in cross-section, and within which there are mounted chuck slides 20 and 21 adapted to have inward and outward movement with respect to the center of the work table. The slides 20 and 21 have chuck jaws 22 and 23, of any suitable form, removably secured upon their upper sides by bolts 24, and preferably positioned by an interlocking tongue and groove joint 25.

As shown in Fig. 1 the chuck jaws are positioned for gripping by inward movement of the slides, and releasing by outward movement. By reversing the slides, as will hereinafter more fully appear, the jaws may be made to grip by outward movement, and release by inward movement.

The work carrying table is further provided with downwardly inclined passages 26 and 27 extending from the center of the slot 19 to the outer peripheral wall of the table, and adapted to convey metal particles produced during the machining operation away from the slot.

In the under surface of the slides 20 and 21 there are respectively provided upwardly extending inclined passages 28, engaged by inclined cam portions 29 provided upon the upper ends of cylindrical slide actuating plungers 30, 30, slidably journaled in vertical cylindrical passages 31, 31, provided in the work table. The under surface of the work table is recessed between the passages 31, 31, as at 32, and in complementary relation to said recess and the passages the upper surface of the base 11 is recessed, as at 33, this recess being larger than the opening of the recess 32 and the passages 31, 31, so that its peripheral wall is outwardly offset with respect to said opening.

The actuating plungers 30, 30, are provided within their cylindrical surfaces with a series of oil grooves 34, to which lubricant is admitted through fittings 35, 35 in the work table. At the inner and outer sides of each of the plungers notches or recesses 36 and 37 are respectively provided, and one or the other—depending upon whether the plunger is in position for inward or outward actuating movement—is engaged by a flange 38 provided at the upper end of a nut 39 mounted in the enlarged central passage 40 at the upper end of the spindle. This nut is adapted for vertical sliding movement, but is fixed against rotation with respect to the spindle by means of key-blocks 41 engaging vertical key-slots 42 provided in the wall of the passage 40 at diametrically opposite points. The nut 39 is interiorly threaded and is engaged by the upper threaded end 43 of a shaft 44 extending downwardly through the central passage 45 of the spindle. A flange 46 is provided near the upper end of the shaft, below the threads, and has bearing between a series of packing rings 47 retained in a shouldered enlargement 48 of the central passage 45 by a centrally apertured threaded lock bushing 49 screwed into the upper end of the portion 48. This bearing permits free rotation of the shaft, but provides resistance against longitudinal movement and affords a compensating action against jamming of the threaded connection between the shaft and nut due to unusual resistance. At the lower end of the spindle the shaft has bearing in a bushing 50. Upon the lower projecting end of the shaft 44 there is splined a gear 51, which is adapted to be meshed with driving means (not shown) for imparting rotation to the shaft when it is desired to open or close the chuck jaws, the shaft being rotated in one direction during the closing operation and in the opposite direction during the opening operation.

The operation of the chuck is as follows:—

Fig. 1 shows the chuck jaws in closed or gripping relation, to which position they have been moved by inward reciprocation. In order to open them—rotation of the spindle having been stopped—the driving means of the shaft 44 is started and rotates the same in clockwise direction, whereupon the nut 39 moves downwardly, imparting upward movement to the actuating plungers 30, and through action of the inclined cam portions 29 moving the chuck jaws outwardly to release the work gripped thereby. In closing the jaws, the shaft is rotated in counter-clockwise direction, drawing the nut and the actuating plungers downwardly and moving the jaws inwardly.

When it is desired to adapt the chuck for gripping by outward movement, the slides 20 and 21, and the plungers 30, are reversed, so that the inclined slots 28 diverge upwardly, and the notches 37 of the plungers are engaged by the flange 38. Downward movement of the nut will now impart outward movement to the chuck jaws. It will be understood that the jaws are replaceable by different sizes and types of jaws, depending upon the particular work being done, and that instead of the two jaws and their actuating plungers, as shown, there may be three or more such jaws and actuating plungers. Downward pull is employed in both inward and outward gripping movements of the jaws, because of the greater resistance to strain.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:—

1. In a chucking device, a rotary work table, chuck jaws carried thereby, plungers having cam means connected to said jaws and adapted to have reciprocatory movement in parallel relation to the axis of rotation of said table, and actuating means engaging recesses in said plungers disposed coaxially to said table and adapted by movement in one or the other directions to impart opening and closing movements to said chuck jaws, said cam connection of jaws and plungers adapting them for reversed positioning in the table.

2. In a chucking device, a work table, chuck jaws carried thereby and provided in their under surfaces with upwardly inclined transverse passages, vertically reciprocating plungers including inclined camming portions slidably engaged in said passages and having recesses, and actuating means connected in the recesses of said plungers and adapted by movement in one or the other directions to impart opening and closing movements to said jaws.

3. In a chucking device, a work table, chuck jaws carried thereby and provided in their under surface with upwardly inclined transverse passages, vertically reciprocating plungers including inclined camming portions slidably engaged in said passages, a vertically movable, flanged actuating member, said plungers having oppositely positioned recesses in their sides for engagement with the flange to permit of the reversed positioning of the plungers with respect to said actuating member.

Signed at Bridgeport, in the county of Fairfield and State of Connecticut, this 13th day of January A. D. 1927.

DUDLEY B. BULLARD.